Patented May 10, 1938

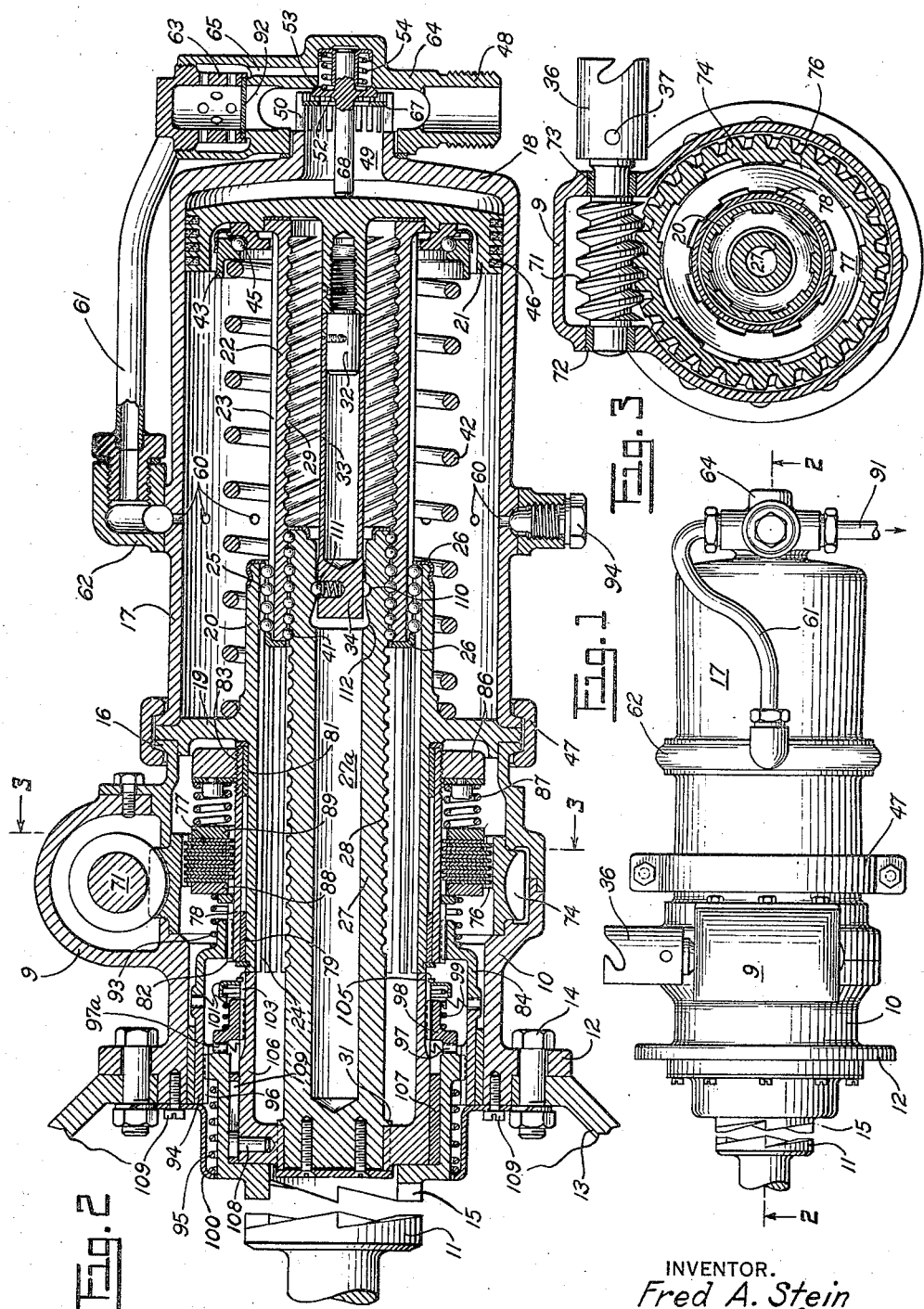

2,117,225

UNITED STATES PATENT OFFICE 2,117,225

ENGINE STARTING MECHANISM

Fred A. Stein, Jersey City, N. J., assignor to Eclipse Aviation Corporation, East Orange, N. J., a corporation of New Jersey Application August 31, 1936, Serial No. 98,781

6 Claims. (Cl. 121—37)

This invention relates to engine starters adapted for utilizing fluid pressure as from air pre-compressed into a reservoir or from an explosive cartridge, the latter embodiment being illustrated in the preferred showing of the drawing.

One of the objects of this invention is to obtain a relatively large number of turns from a relatively short piston travel.

Another object is to provide means for obtaining a corresponding number of turns of the driving jaw independently of the piston.

Another object of the invention is to provide improvements in the type of engine starter disclosed in the application of Romeo M. Nardone, Serial No. 80,885 filed in the United States Patent Office on May 20, 1936, the nature and scope of which improvements are indicated in the accompanying drawing and the following particular description of one form of mechanism embodying the invention. It is to be understood however, that the drawing is for the purpose of illustration only, and is not designed as a definition of the limits of the invention, reference being had to the appended claims for this purpose.

In the drawing:—

Fig. 1 is a view showing the external appearance of a device embodying the invention;

Fig. 2 is a longitudinal sectional view along the line 2—2 of Fig. 1; and

Fig. 3 is a transverse sectional view along the line 3—3 of Fig. 2.

With reference to the drawing, and more particularly to Fig. 1, the piston and engine starting gear unit comprises a body member 10 having a flange 12 by which it is secured to the engine crank case 13 as by bolts 14, the flange being conveniently of a size standardized for aircraft engine starters. The engine crankshaft, or other drive shaft (not shown) is provided with an engine jaw 11 engageable by the starter jaw 15 as will be later more fully described.

Secured in a quickly detachable manner to an annular flange 16 integral with the body 10 is a cylinder 17 having a closed head 18 and a base plate 19 constituting an integral part of a splined sleeve 20. Slidably fitted within the cylinder 17 is a piston 21 movable with the sleeve 22 which is externally splined as at 23, to cooperate with the internally splined sleeve 20. In the cooperating grooves 23 and 24 are placed a series of anti-friction members shown as balls 25, suitable stops 26 being provided at each end of each groove to prevent excessive movement of the balls. A third sleeve 27 is drivably connected with the sleeve 22 by helical grooves 28 and 29 which permit the axial travel of the piston 21 relative to the sleeve 20, but cause rotation of the sleeve 27 in response to said axial travel. Such rotation is facilitated by the anti-friction balls 41 inserted in the helical grooves 28 and 29.

During its travel the hollow shaft 22 slides within the sleeve 20 by means of the splines 23 and 24, and transmits (with the aid of anti-friction balls 41), the starting torque generated from the piston thrust by the helical groove connections 28 and 29, to the sleeve 27, and the friction produced may impose considerable axial pressure on the latter. The anti-friction ball bearings 25 and 41 take such friction reactions which might otherwise impose too much restraint to the return action of the spring 42. This spring 42 has one end resting against the closure plate 19 of the cylinder, and its opposite end abuts the thrust ring 43, which is, in effect, the outer race of a ball bearing assembly 45 axially movable with but rotatably free of the piston 21, the intervening bearing balls 45' facilitating free rotation of the outer race 43 of the bearing on the hollow shaft 22, the outer race being possibly constrained to rotation by a possible twisting action of the spring 42 as the latter is compressed in the forward travel of the piston. Piston rings 46 insure against the loss of pressure as the piston moves forward.

Due to the bolted split clamp connection 47 between the cylinder 17 and the body flange 16, the former may be quickly detached for removing any fouling that may occur where combustible cartridges are used as the source of fluid pressure to move the piston 21. Similarly, exhaust ring 62 may be removed by sliding it over the head end 18 of externally tapered cylinder 17, after retraction of screw detent 94, and following removal of control housing 64.

One of the objects of this invention is to obtain a relatively large number of turns from a relatively short piston travel, wherefore, a relatively short lead or helix angle is used for the main driving threads 28 and 29 and the rolling anti-friction members 41 and 25 are introduced to insure high mechanical efficiency in spite of this small angle of helix.

Another object is to provide means for obtaining a corresponding number of turns of the driving jaw 15 independently of the piston; and said means is shown as including a worm shaft 71 mounted in bearings 72 and 73 (Fig. 3) on opposite side walls of the upper section 9 of the housing 10, and a worm gear 74 in mesh with the worm shaft 71 and internally splined as indicated at 76 to receive correspondingly splined discs 77 of a friction clutch 77a the said splined discs 77 being held in engagement with other splined discs 77, alternating therewith, and in turn splined internally to drive a splined sleeve 78 rotatably mounted (through intermediate bearing sleeves 79 and 81) on the heretofore described element 20. The outer surface of sleeve 78 has splines 82 on one end thereof and threads 83 on the other, the splines 82 being for the purpose of driving the clutch element 84, and the threads 83 being for the purpose of holding a clutch setting ring 86 in position to apply the desired degree of compression to springs 87 and thus determining the torque transmitting capacity of the friction clutch 77a. Pressure plates 88 and 89 assist in holding the clutch engaged, the plate 88 also serving as a seat for another spring 93 which exerts pressure upon ratchet-toothed clutch element 84 to hold it yieldably engaged with the abutting ratchet-toothed clutch element 94. At its rearward end cranking jaw 15 has ratchet teeth 97 normally engaged by similar ratchet teeth 97a on the forward end of a clutch element 98, the engaging pressure being supplied by a yieldable coiled spring 99 whose opposite end abuts a collar 101 held fast to the splines 103 of sleeve 106 by a suitable locking ring 105, the sleeve 106 being splined or keyed to the sleeve 27. Intermediate sleeve 106 and jaw 15 is another sleeve 107 having an obliquely disposed slot 109 therein to receive the head of a pin 108 which is embedded in a radially extending recess in the head portion of sleeve 106, the sleeve 107 being frictionally held to the sleeve portion of jaw 15. Piston 21 has a central extension 32 to which is secured a tube 33 telescopically received within sleeve 27, and having a solid end portion 34 radially bored to receive a spring pressed ball 111 hereinafter more fully described.

The operation of the mechanism so far described is as follows:—

Upon pressure being generated and released from the pressure chamber (not shown) by a pressure element, such as an explosive cartridge, the high pressure fluid is conveyed by means of the pipe connection 48 to the entrance chamber 49 by way of the slotted wall 50, and acts both upon the piston 21 and the valve 52, thus holding the latter upon its seat 53 against the tendency of the spring 54 to unseat it. There being no resistance other than the spring 42 to the movement of the piston 21, it is advanced to the left. By reason of the action of spring-pressed ball 111 successively upon grooves 110 and 112 in sleeve 27, the initial movement of the piston 21 will be transmitted to said sleeve 27, and the axial thrust thus imparted to jaw 15 (through the flange 31 on sleeve 27) will establish engagement with the engine member 11. Upon such engagement the resulting resistance to further axial travel will cause, first, a commencement of rotation on the part of sleeve 106, and secondly, a slipping of the ball 111 from the grooves 110 and 112, so that it may be free to ride along the inner bore 27a of the sleeve 27 as the piston continues forward. Meanwhile cranking of the engine proceeds, and during this action the clutch teeth on the rear of sleeve 94 will ratchet idly over the teeth on the forward end of clutch element 84. In this connection, it is noted that the rear annular end of the starter jaw 15 engages the splines 96 of the sleeve 94 for limited axial travel against the yieldable spring 95 whereby the above described engine engaging movement may occur. Spring 95 abuts a baffle plate 100, and the plate 100 has a flanged portion secured to the body 10 by one or more screws 109. Eventually, the piston will reach a point where the exhaust ports 60 are uncovered, and the fluid pressure will escape through conduit 61; the spring 42 can then return the piston to the normal position shown in the drawing. At whatever point of the travel the engine starts under its own power, it is free to overrun the jaw 15 due to the sloped or angular formation of the teeth, but until this overrunning occurs the jaws 15, 11 will remain meshed.

As the pressure fluid escapes into exhaust ring 62, and passes along conduit 61 in response to the uncovering of the ports 60, it reaches the ported cage 63 of the control housing 64 (on its way to the exhaust pipe 91) and from this region it is effective by reason of the connecting passage 65 (which has a width approximately equal to its length), to exert pressure upon the inner side of the valve 52, thereby creating a pressure which, coupled with that of the spring 54, is sufficient to lift the valve 52 from its seat 53. When this occurs the remaining pressure fluid in the cylinder 17 may escape to the atmosphere by way of the now opened valve 52 (the extent of movement of which is limited by the annular stop 67) and this escape will continue until the return movement of the piston 21—proceeding under the influence of spring 42 which now over-powers the rapidly falling pressure of the escaping fluid— reseats the valve 52 by direct contact with the projecting valve stem 68 in the path of the advancing piston, the length of the valve stem 68 being so chosen as to insure a complete seating of the valve just as the piston reaches the position indicated in the drawing on its return stroke. The fluid under pressure having by this means escaped, the device is now ready for a second operation by re-admission of pressure fluid through the inlet 48 if and when desired.

A frangible disc 92 divides the exhaust cage 63 from the inlet chambers 48, 49, and is subject to rupture to permit escape of fluid in the extraordinary event of excessive pressure, such rupturing permitting the excessive pressure to escape through exhaust pipe 91.

When independent operation is desired, the operator will attach a suitable hand (or power) crank to the projecting slotted tube 36 integrated with worm shaft 71 by suitable means such as the pin 37. Resulting rotation of worm gear 74 and the parts driven therefrom will cause clutch 84, 94 to rotate jaw 15, and such rotation will temporarily carry with it sleeve 107, the latter part riding forward along the oblique slot containing the pin 108, and thus bring jaws 15 and 11 into mesh. Thereafter jaws 15 and 11 will turn as a unit, while sleeve 107 will be held, by pin 108, from further rotation, while the teeth 97 will ratchet idly over teeth on member 98, allowing the piston driven parts to remain at rest. De-meshing of jaw 15 will be effected as noted in the previous description of the piston driven method of operation.

What is claimed is:—

1. In combination with an engine engaging member, means engageable with said engine engaging member to move the latter into engine engaging position in response to rotation thereof, additional means for moving said engine engaging member into engine engaging position independently of rotation thereof, means cooperating with said first named means to produce the rotation necessary to effect engaging movement by operation of said first named means, and fluid pressure actuated means for causing said second named means to move said engine engaging member into engine engaging position independently of operation of said rotating means.

2. In combination with an engine engaging member, means engageable with said engine engaging member to move the latter into engine engaging position in response to rotation thereof, additional means for moving said engine engaging member into engine engaging position independently of rotation thereof, means cooperating with said first named means to produce the rotation necessary to effect engaging movement by operation of said first named means, and fluid pressure actuated means for causing said second named means to move said engine engaging member into engine engaging position independtly of operation of said rotating means, said rotating means including a shaft rotatable about an axis disposed in a plane perpendicular to the axis of rotation of said engine engaging member.

3. In combination with an engine engaging member, means engageable with said engine engaging member to move the latter into engine engaging position in response to rotation thereof, additional means for moving said engine engaging member into engine engaging position independently of rotation thereof, means cooperating with said first named means to produce the rotation necessary to effect engaging movement by operation of said first named means, fluid pressure actuated means for causing said second named means to move said engine engaging member into engine engaging position independently of operation of said rotating means, said rotating means including a shaft rotatable about an axis disposed in a plane perpendicular to the axis of rotation of said engine engaging member and said fluid pressure actuating means including a part movable along said last named axis, and means responsive to such axial movement of said fluid pressure actuated means to produce a predetermined amount of rotation of said engine engaging member following movement thereof to engine engaging position.

4. In combination with an engine engaging member, means engageable with said engine engaging member to move the latter into engine engaging position in response to rotation thereof, additional means for moving said engine engaging member into engine engaging position independently of rotation thereof, means cooperating with said first named means to produce the rotation necessary to effect engaging movement by operation of said first named means, fluid pressure actuated means for causing said second named means to move said engine engaging member into engine engaging position independently of operation of said rotating means, said rotating means including a shaft rotatable about an axis disposed in a plane perpendicular to the axis of rotation of said engine engaging member and said fluid pressure actuating means including a part movable along said last named axis, and means responsive to such axial movement of said fluid pressure actuated means to produce a predetermined amount of rotation of said engine engaging member following movement thereof to engine engaging position, said first named rotating means including clutch elements one of which overruns the other in response to operation of said fluid pressure actuated means.

5. In combination with an engine engaging member, means engageable with said engine engaging member to move the latter into engine engaging position in response to rotation thereof, means cooperating with said first named means to produce the rotation necessary to effect engaging movement by operation of said first named means, and fluid pressure actuated means for causing said engine engaging member to move into engine engaging position and to rotate while in said engine engaging position, said first named rotation producing means including clutch elements one of which overruns the other in response to operation of said fluid pressure actuated means.

6. In combination with an engine engaging member, fluid pressure actuated means for causing said engine engaging member to move into engine engaging position and to rotate while in said engine engaging position, and additional means for rotating said engine engaging member while in engine engaging position, said rotating means including two sets of clutch elements, and each set including a driven member which overruns the driving member whenever the speed of the other set of clutch elements is greater.

FRED A. STEIN.